United States Patent
Ichikawa et al.

(10) Patent No.: US 6,268,585 B1
(45) Date of Patent: *Jul. 31, 2001

(54) METHOD OF FORMING GROOVE BY LASER

(75) Inventors: Tadashi Ichikawa; Hiroshi Ito, both of Aichi (JP)

(73) Assignee: Kabushiki Kaisha Toyota Chuo Kenkyusho, Aichi-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,087

(22) Filed: Aug. 28, 1998

(30) Foreign Application Priority Data

Aug. 29, 1997 (JP) .................................................. 9-249627

(51) Int. Cl.⁷ .................................................. B23K 26/38
(52) U.S. Cl. .............................. 219/121.69; 219/121.73; 219/121.8
(58) Field of Search ...................... 219/121.68, 121.69, 219/121.8, 121.82, 121.71, 121.73

(56) References Cited

U.S. PATENT DOCUMENTS

| 4,734,550 | * | 3/1988 | Imamura et al. . | |
| 4,734,558 | * | 3/1988 | Nakano et al. | 219/121.73 |
| 4,970,366 | * | 11/1990 | Imatou et al. | 219/121.68 |
| 5,393,371 | * | 2/1995 | Chang et al. | 219/121.69 |
| 5,463,200 | * | 10/1995 | James et al. | 219/121.68 |
| 5,739,502 | * | 4/1998 | Anderson et al. | 219/121.71 |

FOREIGN PATENT DOCUMENTS

| 62-168688 | * | 7/1987 | (JP) | 219/121.8 |
| 64-31587 | * | 2/1989 | (JP) . | |
| 2-168210 | | 6/1990 | (JP) . | |
| 3-9309 | | 1/1991 | (JP) . | |
| 7-9180 | * | 1/1995 | (JP) . | |
| 8-19878 | | 1/1996 | (JP) . | |
| 8-148803 | * | 6/1996 | (JP) . | |

* cited by examiner

*Primary Examiner*—Geoffrey S. Evans
(74) *Attorney, Agent, or Firm*—Oblon, Spivak, McClelland, Maier & Neustadt, P.C.

(57) ABSTRACT

A method of forming a groove having a desired cross section easily and rapidly, by making laser beam scan in the longitudinal direction of the groove. In the method, a laser beam 11 is irradiated to a work 15 to form a groove 16. When the longitudinal and the width direction of the groove is the x-axis and the y-axis, respectively, an intensity distribution of the laser beam in an irradiated region Q on the work is expressed by f(x, y). An integral of f(x, y) with respect to x, i.e., g(y), is proportional to a depth distribution of the groove 16, d(y), and the intensity distribution f(x, y) is formed by passing the laser beam 11 through a mask pattern 12a which has an appropriate transmission factor distribution. The groove 16 is formed by moving the region Q in the x-axis direction. The cross section of the groove 16 is determined by the mask pattern 12a. And the groove 16, having a desired cross section, is obtained in one scanning in the x-axis direction.

6 Claims, 4 Drawing Sheets

METHOD OF FORMING GROOVE BY LASER

BACKGROUND OF THE INVENTION

1. Field of the Invention

The present invention relates to a method of forming a groove with desired cross sections by irradiating a laser beam to a work, and more particularly to a method of easily forming the groove which has a constant depth in a scanning direction and an arbitrary depth distribution in the direction vertical to the scanning direction by relatively moving the irradiated area on the work.

2. Description of the Related Art

As a method of forming a groove having various figures of cross sections by a laser beam aberration, a method of irradiating a slit-shaped laser beam converted through a projection mask to the surface of a work, which is moved in the width direction synchronizing to the laser beam pulse oscillation (Japanese Patent Laid-open No. 8-19878) is known.

However, the prior method described above have several problems. In accordance with the method, a complicated and precise control of a scanning velocity is needed to form a desired cross section because a depth of the groove depends on the scanning velocity of the slit-shaped laser beam in the width direction. Furthermore, a period of controlling the scanning velocity, which is modulated in accordance with a desired cross sectional figure, is necessary to be repeated at each time when the laser beam on the work is moved little by little in the longitudinal direction of the groove. Accordingly, in conventional methods, a complicated control for displacement and velocity of the work is required and a large amount of manufacturing time is required because of scanning in two directions of the x-axis and the y-axis.

SUMMARY OF THE INVENTION

An object of the present invention is to form a groove having a desired cross section easily and rapidly, by making a laser beam scan only in a longitudinal direction of the groove to form.

To achieve the above object, the present invention provides a method of forming grooves by irradiating a laser beam to a work. The longitudinal direction of a groove is defined as the x-axis, the width direction of that is defined as the y-axis, and an intensity distribution of an irradiated region on the work is defined as f(x, y). The intensity distribution f(x, y) is formed by passing the laser beam through a mask pattern so that g(y), an integral of f(x, y) with respect to x, may be proportional to d(y), a depth distribution of the groove. And the irradiated region is moved in the x-axis direction.

In the invention described above, f(x, y) may be a constant. In that case, f(x, y) is a function which is 0 out of the irradiated region and a constant A within the region. Accordingly, the function g(y) is $A \cdot \Delta L(y)$, where $\Delta L(y)$ denotes a length in the x-axis direction at y in the irradiated region. $\Delta L(y)$ is determined so that $A \cdot \Delta L(y)$ may be proportional to a depth distribution of groove, d(y). The laser beam is irradiated to the work through the mask pattern having a figure similar to the irradiated region, and then the irradiated region having a desired figure $\Delta L(y)$ is obtained.

When the irradiated region with the intensity distribution f(x, y) scans in the x-axis direction at an constant velocity v, an energy w(x, y) which the point (x, y) receives is given by the following equation: $\int f(x, y) \, dx/v = g(y)/v$. The depth d(y) of the groove formed at the point (x, y) is proportional to the energy w(x, y). Accordingly, the groove having the desired depth distribution d(y) can be obtained when the irradiated region with the strength f(x, y) is formed so that g(y), i.e., the integral of f(x, y) with respect to x may be proportional to d(y), and is moved at the constant velocity v in the x-axis direction. The depth distribution d(y) and the intensity distribution f(x, y) satisfy the relation defined by:

$$\int f(x, y)dx = k \cdot d(y) \tag{1},$$

where k=v/a, "a" represents a proportional constant of depth d(y) to the energy w(x, y).

f(x, y) is obtained by multiplying I(x, y), an intensity distribution of the laser beam without passing the mask pattern, and T(x, y), a transmission factor distribution of the mask pattern. Accordingly I(x, y) and T(x, y) are satisfied with:

$$I(x, y) \cdot T(x, y) = f(x, y) \tag{2},$$

$$\int I(x, y) \cdot T(x, y)dx = \int f(x, y)dx \tag{3}.$$

The following equation is obtained by substituting Eq. 1 into Eq. 3:

$$\int I(x, y) \cdot T(x, y)dx = k \cdot d(y) \tag{4}.$$

Generally, T(x, y) is determined so as to satisfy the Eq. 4 and the irradiated region is moved at a constant velocity in the x-axis direction, to form the groove having the depth distribution of d(y).

When a mean value of T(x, y) with respect to x which is weighted with I(x, y) is defined as S(y), and a length in the x-axis direction at the coordinates y in the irradiated region is defined as L(y), the Eq. 4 is expressed by:

$$S(y) \cdot L(y) = k \cdot d(y) \tag{5}.$$

When a mean transmission factor of the mask pattern and a figure in the x-axis direction are determined so as to satisfy the relation represented by the Eq. 5, d(y) is obtained.

In a case where the transmission factor of the mask pattern is 1 in the irradiated region and 0 outside the region, the following equation is satisfied:

$$\int I(x, y)dx = k \cdot d(y) \tag{6}.$$

When a mean value of I(x, y) with respect to x is defined as b(y), the following equation is satisfied:

$$L(y) = k \cdot d(y)/b(y) \tag{7}.$$

Because the irradiated region is equal to magnification of the mask pattern m times, a length distribution E(y) in the x-axis direction, in the area where the transmission factor of the mask pattern is 1, can be expressed with d(y) as follows:

$$E(y) = k \cdot d(y)/(b(y) \cdot m) \tag{8}.$$

And in case that b(y) can be approximated to be a constant b, E(y) is expressed by the following equation:

$$E(y) = k \cdot d(y)/(b \cdot m) \tag{9}.$$

Thus the length distribution of the mask pattern, E(y), can be determined by the depth distribution of the groove, d(y). By passing the laser beam through the thus-obtained mask pattern, forming the irradiated region on the work, and moving the region at a constant velocity in the x-axis direction, the groove having the desired depth distribution d(y) and a length in the x-axis can be obtained. Because a cross sectional figure of the groove is determined by the mask pattern, the groove having a complicated cross section can be easily obtained. Furthermore, the groove having a desired cross section can be obtained only by making laser beam scan one time, at a constant velocity in one axis direction. Thus, in the present invention, an operation of forming a groove having a desired cross section becomes simple and easy.

DETAILED DESCRIPTION OF THE PREFERRED EMBODIMENTS

The present invention will be described hereinbelow with reference to specific embodiments.

Figure 1:
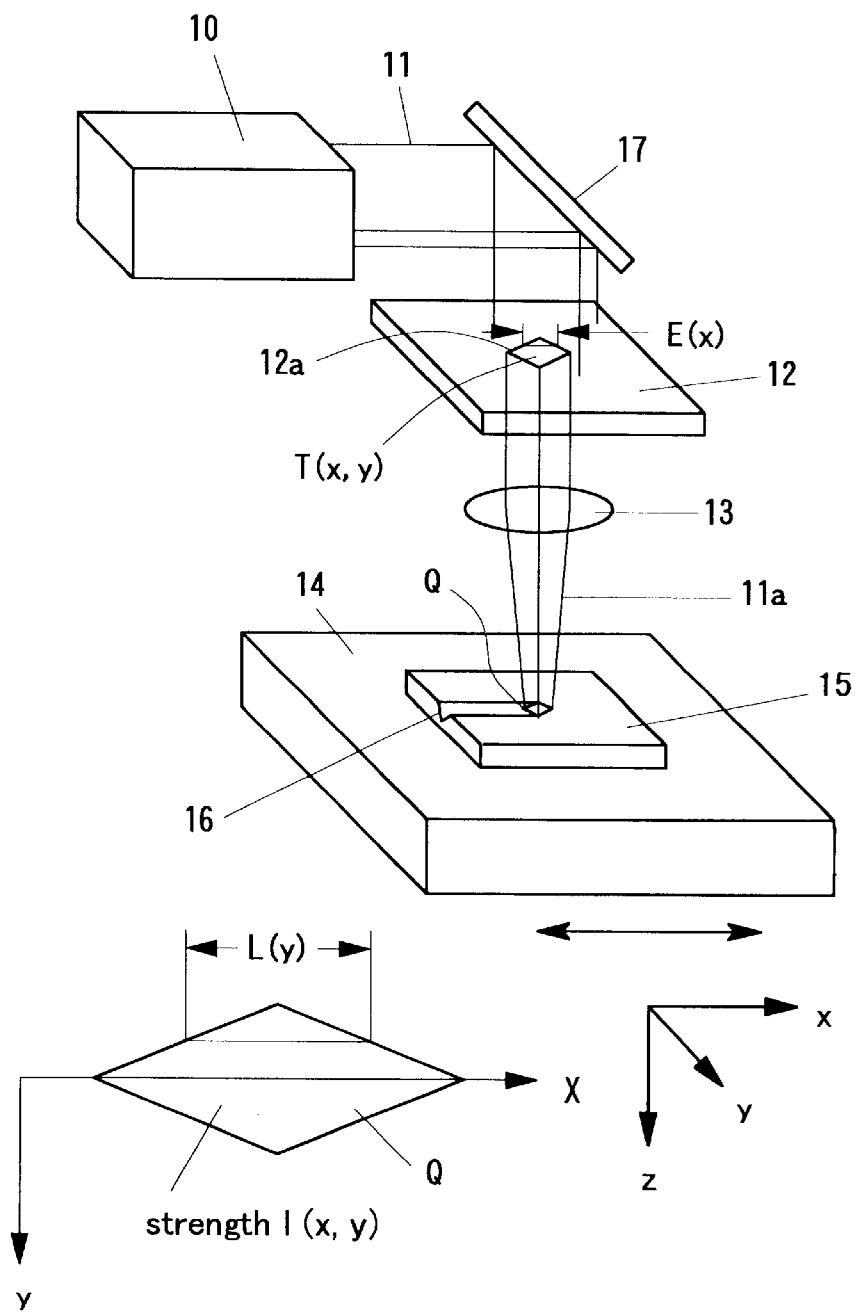
FIG. 1 is a view showing the structure of a device which practices a method of forming a groove by a laser beam in accordance with the embodiment of the present invention.

FIG. 1 illustrates a structure of the device which uses the method according to the embodiments of the present invention. A laser oscillator 10 emits a laser beam 11, whose transmission direction is changed by a mirror 17. Then the laser beam passes through a projection mask 12 and a focusing lens 13, and is irradiated on a work 15 placed on an XY stage 14. The lens 13 is placed between the work 15 and the mask 12. The mask 12 is positioned so that a mask pattern 12a formed on the mask 12 may be projected on the surface of the work 15. The mask 12 has a transmission factor of T(x, y), and the transmission factor of T(x, y) in the pattern 12a is 1 and the transmission factor of T(x, y) of the rest part of the mask 12 is 0.

When the oscillator 10 emits the laser beam 11, the laser beam 11a shaped by the mask pattern 12a whose area is determined by T(x, y)=1 is irradiated on the surface of the work 15. An image of the mask pattern 12a is an irradiated region Q. Then at least one of the XY stage 14 and the laser beam 11a is moved at a constant velocity v, in the scanning direction x which is a longitudinal direction of grooves. As a result, a groove 16 which has a length in the direction x, width in the direction y and depth in the direction z is formed as shown in FIG. 1.

Figure 2:
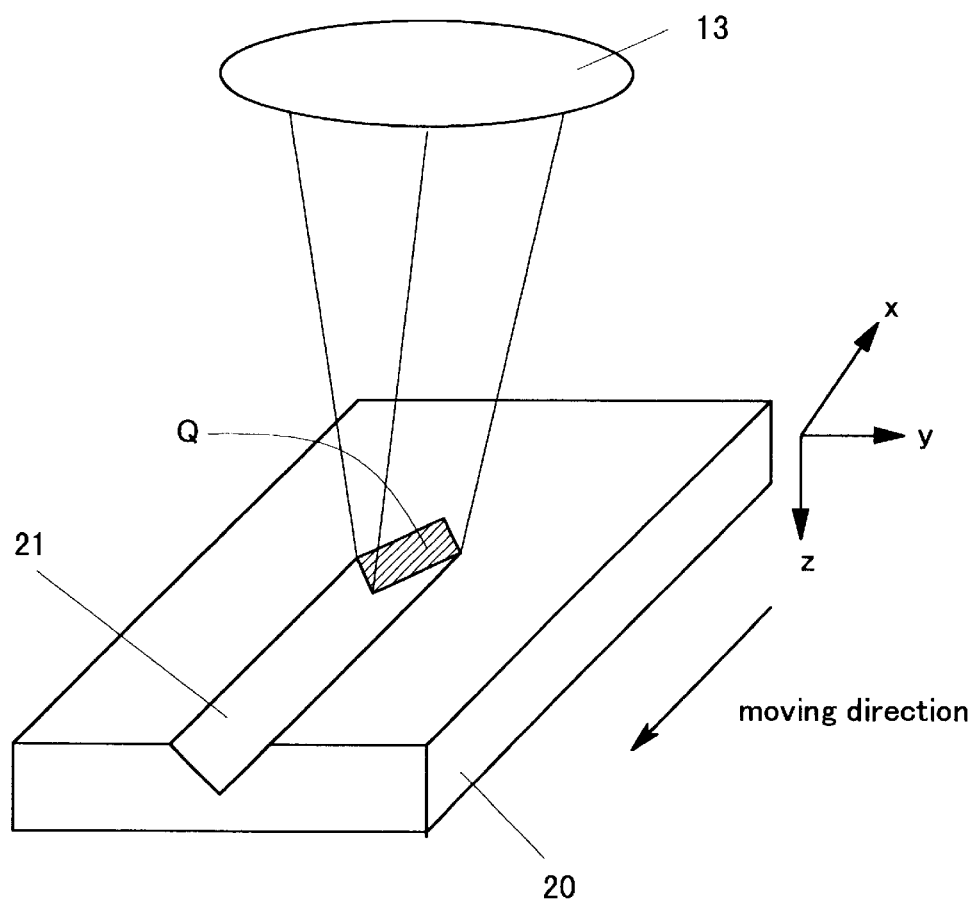
FIG. 2 is a view showing a relation between an irradiated region Q and a cross section of a groove 21 formed in the embodiment.
Figure 3:
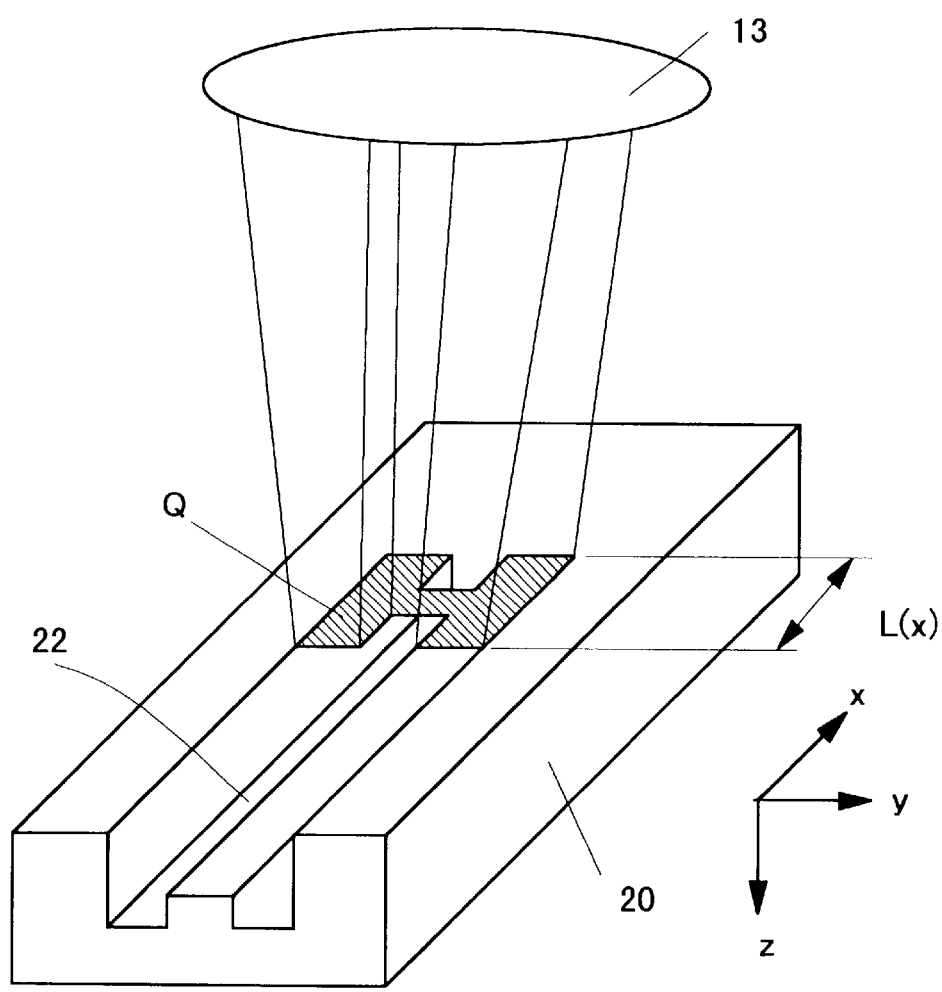
FIG. 3 is a view showing a relation between an irradiated region Q and a cross section of a groove 22 formed in the embodiment.
Figure 4:
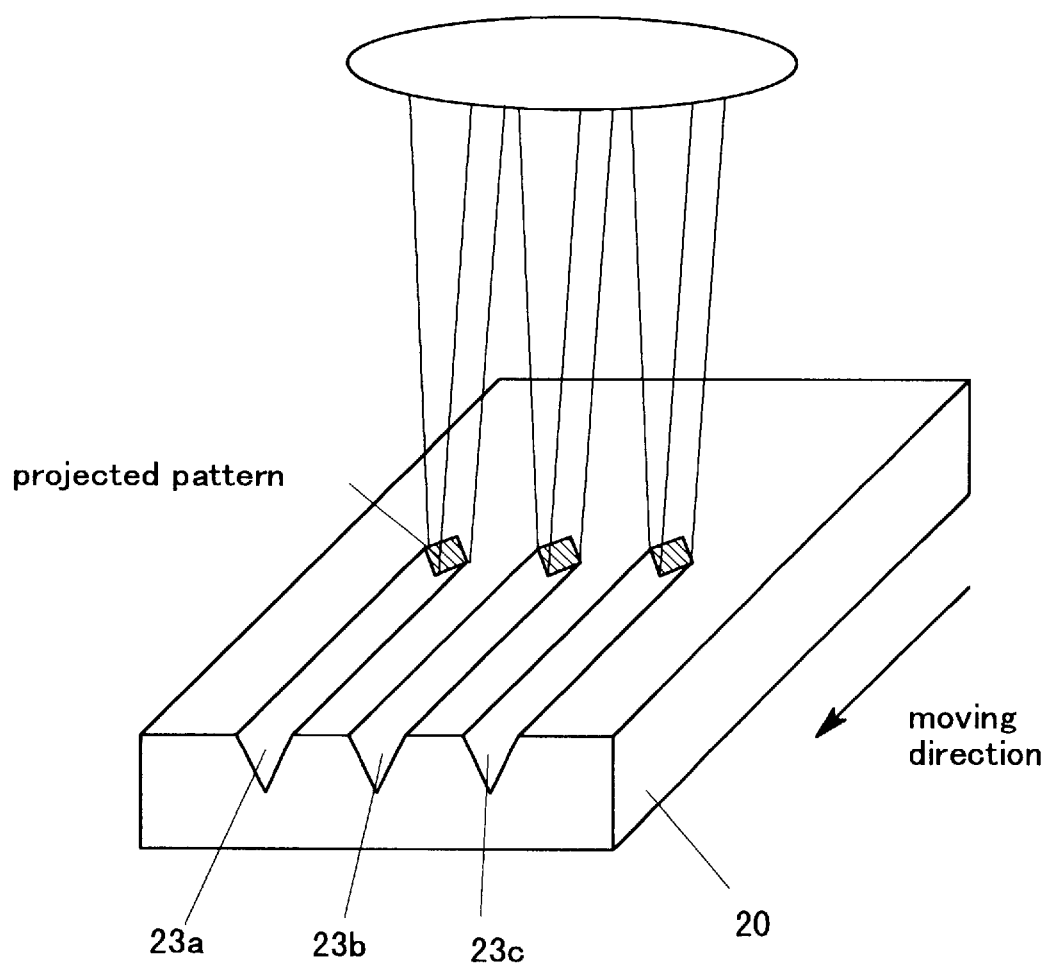
FIG. 4 is a view showing a relation between an irradiated region Q and a cross section of a groove 23a, 23b, and 23c formed in the embodiment.

As shown in FIGS. 2, 3, and 4, the present method is also used to form grooves 21, 22, and 23. The grooves are to be used to fix an optical fiber on a waveguide substrate 20. Glass, metal, semiconductor, resin or other materials can be used for the substrate 20. In this embodiment, $LiNbO_3$, frequently used for the integrated optics material, is used as the substrate 20. An appropriate excimer laser is used as the laser oscillator 10 depending on the work material. The oscillator 10 is adjusted to emit an excimer laser beam 11 having an appropriate energy concentration and a flat intensity distribution in a cross section of the beam. That is, an intensity distribution I(x, y) shown in FIG. 1 is adjusted to have a constant value b.

When the I(x, y) is constant in the irradiated region Q, Eq. 7 is satisfied, and a depth d(y) of the groove 16 is determined by an L(y) which is a length in a scanning direction x of the irradiated region Q. When the L(y) becomes larger, an irradiation time of the laser beam be longer and the d(y) be larger. And when the L(y) becomes smaller, an irradiation time of the laser beam be shorter and the d(y) be smaller. Accordingly determining E(y), or a length in the scanning direction x of the pattern 12a on the projection mask 12, in accordance with the depth d(y) by using Eq. 9, the groove 16 having a desired depth distribution d(y) can be obtained.

The projection mask 12 is formed by perforating a metal board. A pattern of the projection mask 12 is determined in accordance with a sectional figure of a groove to form. To form a groove with a V-shape cross section, an appropriate pattern of isosceles triangle, rhombus, rectangle, and so on, corresponding to a basic angle of the V-shape groove is used. As shown in FIG. 2, a projection mask with a rhombus pattern is used in the embodiment. The XY stage 14 is moved parallel to a diagonal line of a rhombus pattern Q projected on the substrate 20, or in the x-axis, at a constant velocity to form a V-shape groove.

In the present invention, a groove having a desired cross section is easily obtained by changing the pattern 12a of the projection mask 12. As shown in FIG. 3, a convex groove 22 having a convex portion at the center of the groove can be obtained by using an H-shape mask and moving the waveguide substrate 20 as a work in the x-axis direction. And as shown in FIG. 4, grooves 23a, 23b and 23c can be obtained at a time with a mask having plural patterns formed apart. Consequently, the present invention is useful to form a groove to fix an optical fiber easily.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of forming a groove by a laser beam, comprising:

irradiating a laser beam to a work through a mask pattern to obtain an intensity distribution f(x,y) so that g(y), an integral of f(x,y) with respect to x, may be proportional to d(y), a depth distribution of said groove, when a longitudinal direction of said groove is defined as the x-axis, a width direction of said groove is defined as the y-axis, and an intensity distribution in an irradiated region on said work is defined as f(x,y); and scanning said irradiated region in the x-axis direction to form said groove which has a length in the x-axis direction and said depth distribution d(y), wherein said g(y) is not constant with respect to y, said laser beam is continuously scanned in the x-axis direction at a constant velocity, and said groove has a constant depth in the x-axis direction.

2. A method of forming a groove according to claim 1, wherein said mask pattern has a transmission factor distribution T(x, y) similar to said intensity distribution f(x, y).

3. A method of forming a groove according to claim 1, wherein said intensity distribution f(x, y) is obtained by multiplying I(x, y), an intensity distribution of the laser beam not passed through the mass pattern, and T(x, y), a transmission factor distribution of the mask pattern.

4. A method of forming a groove according to claim 1, wherein said mask pattern comprises isolated plural transmission sections to form the corresponding plural isolated grooves.

5. A method of forming a groove according to claim 1, wherein said groove is formed to fix an optical fiber on an optical waveguide substrate.

6. A method of forming a groove according to claim 1, wherein said mask pattern is at least one of a triangle, an isosceles triangle, a rhombus and a rectangle.

* * * * *